United States Patent
Fujiwara et al.

(10) Patent No.: US 12,234,882 B2
(45) Date of Patent: Feb. 25, 2025

(54) TOOTHED BELT (71) Applicant: BANDO CHEMICAL INDUSTRIES, LTD., Kobe (JP)

(72) Inventors: Katsuyoshi Fujiwara, Kobe (JP); Yuji Sekiguchi, Kobe (JP)

(73) Assignee: BANDO CHEMICAL INDUSTRIES, LTD., Kobe (JP)

( * ) Notice: Subject to any disclaimer, the term of this patent is extended or adjusted under 35 U.S.C. 154(b) by 0 days.

(21) Appl. No.: 18/287,949

(22) PCT Filed: Apr. 26, 2022

(86) PCT No.: PCT/JP2022/018881
§ 371 (c)(1),
(2) Date: Oct. 23, 2023

(87) PCT Pub. No.: WO2022/230872
PCT Pub. Date: Nov. 3, 2022

(65) Prior Publication Data
US 2024/0102534 A1 Mar. 28, 2024

(30) Foreign Application Priority Data
Apr. 30, 2021 (JP) ................. 2021-077942

(51) Int. Cl.
*F16G 1/28* (2006.01)
(52) U.S. Cl.
CPC ..................... *F16G 1/28* (2013.01)
(58) Field of Classification Search
CPC ..... F16G 1/10; F16G 1/08; F16G 1/14; F16G 1/16
(Continued)

(56) References Cited

U.S. PATENT DOCUMENTS 3,404,578 A * 10/1968 Koch ................. F16G 1/14
  416/241 A
3,937,094 A * 2/1976 Cicognani ............. B32B 5/26
  474/205
(Continued)

FOREIGN PATENT DOCUMENTS

CN 107921735 A 4/2018
JP H05-013821 B2 2/1993
(Continued)

OTHER PUBLICATIONS

International Search Report issued on Jul. 19, 2022 for PCT/JP2022/018881 with its English Translation.

*Primary Examiner* — Henry Y Liu
(74) *Attorney, Agent, or Firm* — Faegre Drinker Biddle & Reath LLP (57) ABSTRACT

A toothed belt includes: a belt body having a flat band-shaped back rubber portion and tooth rubber portions placed on an inner circumferential side of the back rubber portion, the back rubber portion and the tooth rubber portions being each composed of a thermoplastic elastomer composition; a cord containing carbon filaments; and a tooth portion covering material provided on an inner circumferential side of the belt body and covering the tooth rubber portions. An elastomer component of the thermoplastic elastomer composition is a TPAE or a TPC, a hardness of the thermoplastic elastomer composition forming the back rubber portion is not less than 25 and not greater than 70, a hardness of the thermoplastic elastomer composition forming the tooth rubber portions is not less than 40 and not greater than 70, and the hardness of the thermoplastic elastomer composition forming the back rubber portion is not greater than the hardness of the thermoplastic elastomer composition forming the tooth rubber portions.

8 Claims, 9 Drawing Sheets (58) Field of Classification Search
USPC .................................................. 474/205
See application file for complete search history.

(56) References Cited

U.S. PATENT DOCUMENTS

| | | | | |
|---|---|---|---|---|
| 4,392,842 A | * | 7/1983 | Skura | F16G 1/28 474/205 |
| 4,445,879 A | * | 5/1984 | Cicognani | F16G 1/28 474/264 |
| 4,614,509 A | * | 9/1986 | Tangorra | F16H 7/023 474/205 |
| 4,627,828 A | * | 12/1986 | Nagai | F16G 1/28 474/205 |
| 4,632,665 A | * | 12/1986 | Skura | B29D 29/08 474/205 |
| 4,721,496 A | * | 1/1988 | Yokoyama | F16G 5/20 474/263 |
| 4,776,828 A | * | 10/1988 | Mashimo | B29D 29/08 474/260 |
| 5,234,387 A | * | 8/1993 | Fujiwara | C08K 5/3415 474/205 |
| 5,405,299 A | * | 4/1995 | Kubo | F16H 7/023 474/205 |
| 5,478,286 A | * | 12/1995 | Hamano | F16G 1/28 474/271 |
| 5,599,246 A | * | 2/1997 | Fujiwara | C08K 5/103 474/271 |
| 5,853,849 A | * | 12/1998 | Nishio | B32B 3/10 474/84 |
| 5,860,883 A | * | 1/1999 | Jonen | C08K 5/098 474/271 |
| 6,220,983 B1 | * | 4/2001 | Osako | D02G 3/447 474/263 |
| 6,485,384 B1 | * | 11/2002 | Ochiai | F16H 7/023 474/204 |
| 6,605,014 B2 | * | 8/2003 | Isshiki | F16G 1/28 474/263 |
| 8,859,081 B2 | * | 10/2014 | Baldovino | B32B 25/10 524/565 |
| 2006/0063627 A1 | * | 3/2006 | Tomobuchi | F16G 1/28 474/260 |
| 2006/0079362 A1 | * | 4/2006 | Tomobuchi | F16G 1/28 474/260 |
| 2008/0318719 A1 | * | 12/2008 | Izu | F16G 1/28 474/205 |
| 2009/0011884 A1 | * | 1/2009 | Nakashima | F16G 5/20 474/205 |
| 2010/0004082 A1 | * | 1/2010 | Di Meco | F16G 1/28 474/205 |
| 2010/0120566 A1 | * | 5/2010 | Izu | F16G 1/28 474/205 |
| 2011/0111902 A1 | * | 5/2011 | Well | C08L 15/005 474/204 |
| 2011/0118068 A1 | * | 5/2011 | Mitsutomi | F16G 1/10 474/205 |
| 2011/0237374 A1 | * | 9/2011 | Nakao | F16G 1/08 474/205 |
| 2012/0192822 A1 | * | 8/2012 | Rolando | F16G 1/28 123/90.31 |
| 2012/0252619 A1 | * | 10/2012 | Uchigashima | F16G 1/10 474/205 |
| 2013/0040771 A1 | * | 2/2013 | Well | F16G 1/28 474/205 |
| 2013/0059690 A1 | * | 3/2013 | Di Cesare | F16G 1/28 474/205 |
| 2014/0080647 A1 | * | 3/2014 | Sakamoto | F16G 1/28 474/205 |
| 2014/0206487 A1 | * | 7/2014 | Tomobuchi | C08J 5/046 474/205 |
| 2016/0208889 A1 | * | 7/2016 | Yoshida | B32B 5/02 |
| 2018/0194561 A1 | | 7/2018 | Remp et al. | |
| 2020/0116230 A1 | * | 4/2020 | Tamura | B29D 29/08 |
| 2020/0182329 A1 | * | 6/2020 | Ikeda | F16G 1/28 |
| 2020/0198268 A1 | * | 6/2020 | Ikeda | F16G 1/28 |
| 2021/0018063 A1 | * | 1/2021 | Noborikawa | D03D 15/573 |

FOREIGN PATENT DOCUMENTS

| | | |
|---|---|---|
| JP | H07-027178 A | 1/1995 |
| JP | H10-002379 A | 1/1998 |
| JP | 2008-144965 A | 6/2008 |
| JP | 2015-064103 A | 4/2015 |
| JP | 2018-204790 A | 12/2018 |

* cited by examiner

TOOTHED BELT

TECHNICAL FIELD

The present invention relates to a toothed belt.

This application claims priority on Japanese Patent Application No. 2021-077942 filed on Apr. 30, 2021, the entire content of which is incorporated herein by reference.

BACKGROUND ART

A toothed belt includes, for example, a back rubber portion, a large number of tooth rubber portions provided integrally on the back rubber portion at a predetermined pitch in the belt longitudinal direction, and a cord embedded between the back rubber portion and the tooth rubber portions at a predetermined pitch in the belt width direction so as to extend in the belt longitudinal direction.

As such a toothed belt, a toothed belt in which a back rubber portion and tooth rubber portions are each formed from a thermoplastic elastomer has been proposed (see, for example, PATENT LITERATURES 1 and 2).

CITATION LIST

Patent Literature

PATENT LITERATURE 1: Japanese Laid-Open Patent Publication No. H7-27178
PATENT LITERATURE 2: Japanese Laid-Open Patent Publication No. H10-2379

SUMMARY OF THE INVENTION

Technical Problem

A toothed belt in which a thermoplastic elastomer composition is used to form a back rubber portion and tooth rubber portions has a problem in that belt teeth are likely to be deformed when a load is applied to a pulley around which the belt is trained. Furthermore, deformation of the tooth rubber portions may cause chipping of the belt teeth, leading to tooth skipping.

In such a toothed belt in which a thermoplastic elastomer composition is used to form a back rubber portion and tooth rubber portions, it can be considered to increase the hardness of the used thermoplastic elastomer composition in order to suppress deformation of the belt teeth. However, in this case, the inconvenience of early occurrence of cracks in the back surface of the belt has been observed.

Solution to Problem

The present inventors have conducted an intensive study to solve such a problem, and have completed a toothed belt in which thermoplastic elastomer compositions are used as the materials of tooth rubber portions and a back rubber portion and which can suppress deformation of the tooth rubber portions and can suppress occurrence of cracks in a back surface of the belt.

(1) A toothed belt of the present invention includes:
a belt body having a flat band-shaped back rubber portion and a plurality of tooth rubber portions placed on an inner circumferential side of the back rubber portion, provided integrally with the back rubber portion, and forming tooth portions, respectively, the back rubber portion and the tooth rubber portions being each composed of a thermoplastic elastomer composition;
a cord placed and embedded in a portion on the inner circumferential side of the back rubber portion so as to form a spiral having a pitch in a belt width direction, and containing carbon filaments; and
a tooth portion covering material provided on an inner circumferential side of the belt body and covering the plurality of tooth rubber portions, wherein
an elastomer component of the thermoplastic elastomer composition is a polyamide-based thermoplastic elastomer (TPAE) or a polyester-based thermoplastic elastomer (TPC),
a hardness of the thermoplastic elastomer composition forming the back rubber portion is not less than 25 and not greater than 70,
a hardness of the thermoplastic elastomer composition forming the tooth rubber portions is not less than 40 and not greater than 70, and
the hardness of the thermoplastic elastomer composition forming the back rubber portion is not greater than the hardness of the thermoplastic elastomer composition forming the tooth rubber portions.

In the above toothed belt, the back rubber portion and the tooth rubber portions are each composed of a composition in which a polyamide-based thermoplastic elastomer (TPAE) or a polyester-based thermoplastic elastomer (TPC) is an elastomer component. Therefore, in the production process, a vulcanization step and a post-vulcanization step are not required, resulting in excellent productivity. In addition, the above elastomer component is resistant to heat, and has a small decrease in elastic modulus even at a heat generation temperature when the belt is driven at a high load or at a high rotation speed. Therefore, deformation is less likely to occur when the belt is driven, and problems such as tooth skipping caused by deformation of the tooth rubber portions are less likely to arise.

The toothed belt includes a cord containing carbon filaments, as a cord.

Since the cord containing carbon filaments has a high elastic modulus, the toothed belt is not easily deformed even when a high load is applied to the toothed belt, so that the toothed belt is less likely to come out of mesh with a pulley. Therefore, a situation in which the belt comes out of mesh with the pulley, thereby getting caught on the pulley or the belt tooth is chipped due to a local force applied to the belt, can be avoided. In addition, since the cord containing carbon filaments does not have creep characteristics as in organic fibers, the toothed belt is very difficult to stretch, and is less likely to cause a decrease in tension.

In the above toothed belt, the thermoplastic elastomer compositions forming the back rubber portion and the tooth rubber portions each have a specific hardness, and the hardness of the thermoplastic elastomer composition forming the back rubber portion is not greater than the hardness of the thermoplastic elastomer composition forming the tooth rubber portions.

By satisfying such a configuration, the above toothed belt suppresses occurrence of cracks in the back surface of the belt and can be used over a long period of time.

(2) In the above toothed belt, preferably, the hardness of the thermoplastic elastomer composition forming the back rubber portion is less than the hardness of the thermoplastic elastomer composition forming the tooth rubber portions.

(3) In the above toothed belt, preferably, a difference between the hardness of the thermoplastic elastomer composition forming the back rubber portion and the hardness of the thermoplastic elastomer composition forming the tooth rubber portions is not less than 10.

These cases are further suitable for suppressing occurrence of cracks in the back surface.

(4) In the above toothed belt, preferably,
the hardness of the thermoplastic elastomer composition forming the back rubber portion is not less than 25 and not greater than 50, and
the hardness of the thermoplastic elastomer composition forming the tooth rubber portions is not less than 45 and not greater than 65.

This case is further suitable for suppressing deformation of the tooth rubber while suppressing occurrence of cracks in the back surface.

(5) In the above toothed belt, preferably, the elastomer component is a polyamide-based thermoplastic elastomer (TPAE).

The TPAE is suitable as a material for forming the tooth rubber portions and the back rubber portion of the toothed belt since the TPAE has low energy loss against dynamic deformation, generates less heat due to bending, and has excellent chemical resistance.

Advantageous Effects of the Invention

In the toothed belt of the present invention, the belt teeth are less likely to be deformed, and cracks are less likely to occur in the back surface of the belt.

DETAILED DESCRIPTION

Hereinafter, embodiments of the present invention will be described with reference to the drawings. The present invention is not limited to these embodiments.

Figure 1:
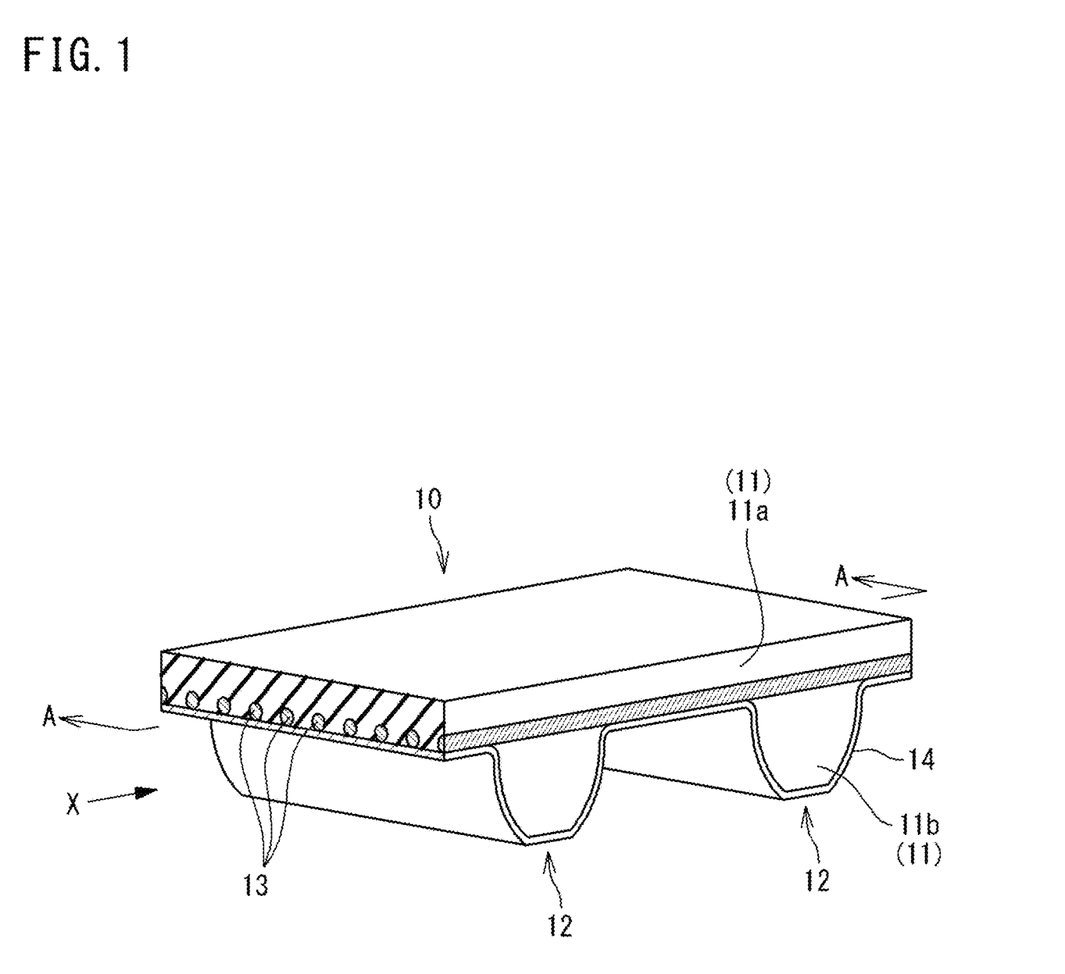
FIG. 1 is a perspective view schematically showing a part of a toothed belt.
Figure 2:
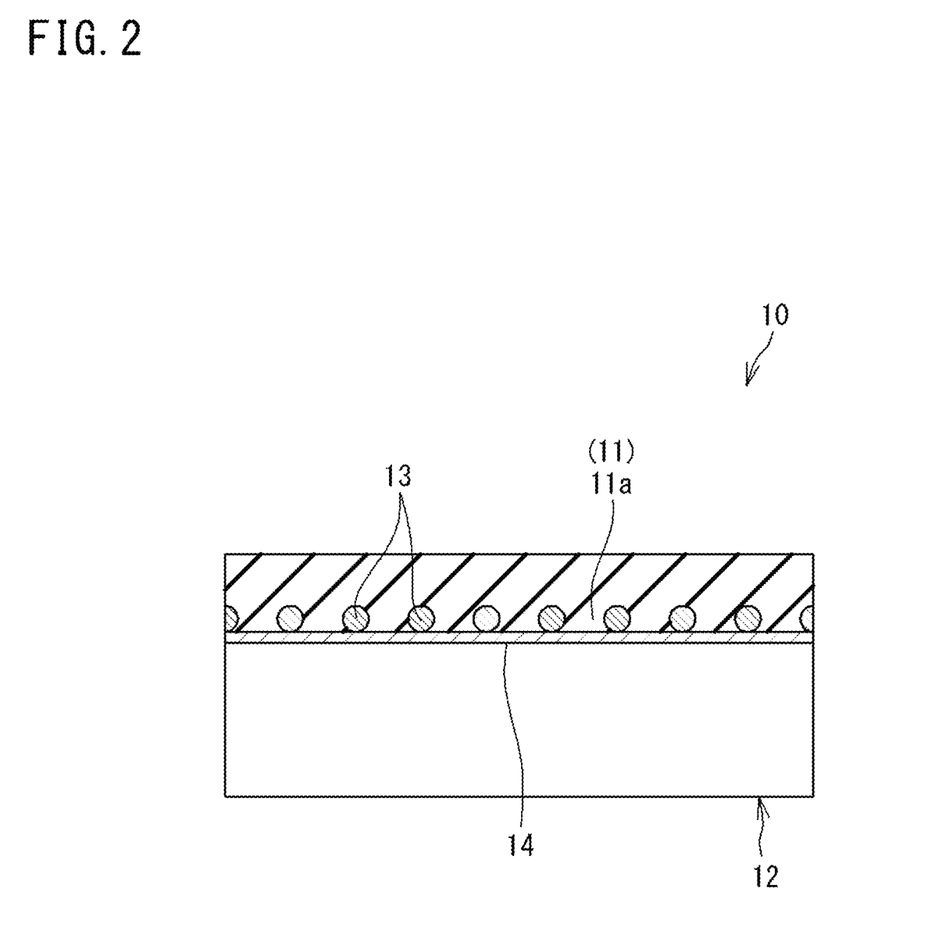
FIG. 2 is a front view as seen in the direction of an arrow X in FIG. 1.
Figure 3:
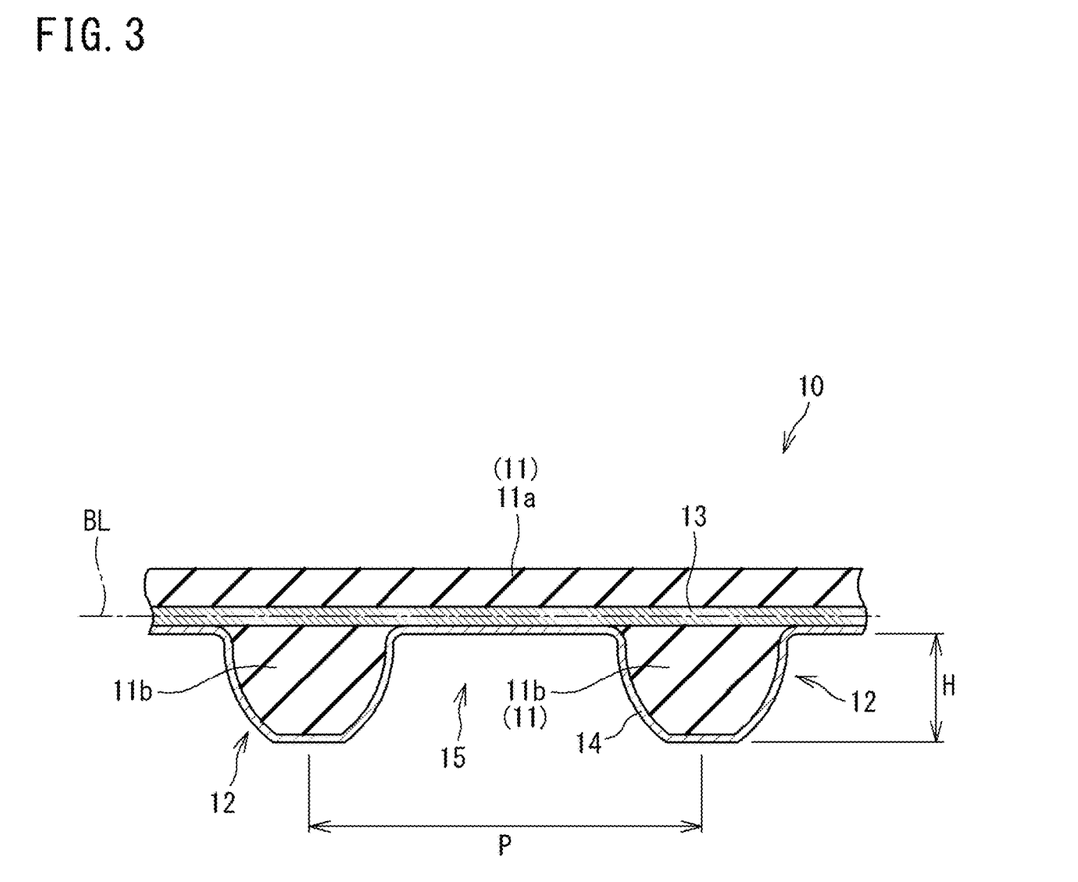
FIG. 3 is an end view taken along a line A-A in FIG. 1.

FIG. 1 is a perspective view showing a part of a toothed belt 10 according to one embodiment of the present invention. FIG. 2 is a front view as seen in the direction of an arrow X in FIG. 1. FIG. 3 is an end view taken along a line A-A in FIG. 1.

<Toothed Belt>

The toothed belt 10 is an endless synchronous transmission belt.

FIG. 1 shows only a part of the toothed belt 10.

The toothed belt 10 includes a belt body 11, a cord 13, and a reinforcement fabric 14 as a tooth portion covering material.

The dimensions of the toothed belt 10 are not particularly limited, and can be selected according to the design.

As for the dimensions of the toothed belt 10, for example, the belt circumference (belt length at a belt pitch line BL) can be not less than 54 mm and not greater than 6600 mm, the belt width can be not less than 3 mm and not greater than 340 mm, and the belt maximum thickness can be not less than 1.3 mm and not greater than 13.2 mm. These toothed belt dimensions are examples.

In the toothed belt 10, a plurality of belt teeth 12 are placed on the inner circumferential side so as to be spaced at a predetermined pitch. The tooth profile of each belt tooth 12 is an S tooth profile.

In the embodiment of the present invention, the tooth profile of each belt tooth 12 is not limited to an S tooth profile, and may be a curvilinear tooth profile other than the S tooth profile, may be a trapezoidal tooth profile, or may be another tooth profile.

In the toothed belt 10, each belt tooth 12 is a straight tooth extending parallel to the belt width direction.

In the embodiment of the present invention, each belt tooth 12 may be a helical tooth extending in a direction inclined with respect to the belt width direction.

In the toothed belt 10, a tooth pitch P (see P in FIG. 3) of the belt teeth 12 is, for example, not less than 2 mm and not greater than 20 mm.

The tooth height of each belt tooth 12 is defined as the dimension (see H in FIG. 3) from a tooth bottom portion 15 between a pair of belt teeth 12 adjacent to each other in the belt length direction to the tip of the belt tooth 12. The tooth height of each belt tooth 12 is, for example, not less than 0.76 mm and not greater than 8.4 mm.

The number of teeth of the toothed belt 10 is, for example, not less than 27 and not greater than 560. The tooth width (dimension in the belt length direction) of the toothed belt 10 is, for example, not less than 1.3 mm and not greater than 15.0 mm. The PLD of the toothed belt 10 is, for example, not less than 0.254 mm and not greater than 2.159 mm. These belt tooth dimensions are examples and are not limited to these ranges.

<Belt Body>

The belt body 11 has an endless flat band-shaped back rubber portion 11a and a plurality of tooth rubber portions 11b. The plurality of tooth rubber portions 11b are provided integrally on an inner circumferential side, which is one side of the back rubber portion 11a, so as to be spaced in the belt length direction. The back rubber portion 11a and the tooth rubber portions 11b of the belt body 11 are each composed of a thermoplastic elastomer composition.

The thermoplastic elastomer composition forming the back rubber portion 11a and the thermoplastic elastomer composition forming the tooth rubber portions 11b may be the same or different.

In the present invention, a thermoplastic elastomer composition refers to a composition that contains a thermoplastic elastomer component as an essential component and can contain various additives other than the above elastomer component as optional components if necessary.

Each of the above thermoplastic elastomer compositions may contain only an elastomer component.

The above elastomer component of each thermoplastic elastomer composition forming the belt body 11 is a polyamide-based thermoplastic elastomer (TPAE) or a polyester-based thermoplastic elastomer (TPC).

Compared to other thermoplastic elastomers such as olefin-based, styrene-based, and urethane-based thermoplastic elastomers, the TPAE and the TPC are more resistant to heat and have a smaller decrease in elastic modulus even at belt temperatures during high-load driving and high-speed rotary driving. Therefore, in the toothed belt 10, deformation of the tooth rubber portions due to heat generation during high-load driving and high-speed rotary driving is less likely to occur.

The above elastomer component is preferably the polyamide-based thermoplastic elastomer (TPAE).

Compared to the TPC, the TPAE has lower energy loss against dynamic deformation and generates less heat due to bending. Therefore, the toothed belt 10 in which the TPAE is used has a relatively low belt temperature during driving and is suitable for power transmission under a high load or at a high speed.

The TPAE also has excellent chemical resistance. Therefore, the toothed belt 10 in which the TPAE is used is suitable as toothed belts for use in applications where contact with chemicals is expected, such as industrial machines including hydraulic devices, drive units of two-wheeled vehicles, and electric seats for passenger cars.

The above polyester-based thermoplastic elastomer (TPC) is a block copolymer in which a polyester structure such as polybutylene terephthalate (PBT) is used as a hard segment and polyether, polyester, or polycarbonate is used as a soft segment.

The above polyamide-based thermoplastic elastomer (TPAE) is a block copolymer with a polyamide (nylon) as a hard segment and a polyol as a soft segment.

Examples of the above polyamide (nylon) include nylon 6, nylon 66, nylon 11, nylon 12, nylon 610, nylon 612, nylon 1212, etc.

Among them, nylon 11 and nylon 12 are preferable since these nylons have a low amide bond content and are less likely to cause dimensional change.

As the above polyol, one of or both a polyester polyol and a polyether polyol can be used.

When the polyester polyol and the polyether polyol are compared, the polyether polyol is more preferable since the polyether polyol is likely to exhibit rubber elasticity at normal temperature even without blending a plasticizer and the belt is less likely to crack when the belt is bent.

In the case where the polyether polyol is used as the polyol component of the TPAE, a plasticizer does not have to be blended, and in a toothed belt in which a tooth rubber portion and each back rubber portion are each composed of a thermoplastic elastomer composition containing no plasticizer, no plasticizer volatilizes and adheres to a facility or products. Therefore, such a toothed belt is suitable for use in a clean room.

Examples of the above polyester polyol include polyethylene adipate, polybutylene adipate, etc.

Examples of the above polyether polyol include polytetramethylene ether glycol, polyoxypropylene glycol, etc.

As each of the above polyester-based thermoplastic elastomer and the above polyamide-based thermoplastic elastomer, a commercially available product can also be used.

Examples of the commercially available product as the above polyester-based thermoplastic elastomer include the HYTREL (registered trademark) series manufactured by DU PONT-TORAY CO., LTD.

Examples of the commercially available product as the above polyamide-based thermoplastic elastomer include the PEBAX (registered trademark) series manufactured by Arkema S.A., the VESTAMID (registered trademark) series and the DAIAMID (registered trademark) series manufactured by Daicel-Evonik Ltd., and the GRILFLEX (registered trademark) series manufactured by EMS-CHEMIE AG.

In addition to the elastomer component such as TPAE and TPC, the thermoplastic elastomer compositions forming the back rubber portion 11a and each tooth rubber portion 11b may each contain additives such as a short fiber, a whisker, a filler, a colorant, an antistatic agent, a flame retardant, an antioxidant, a UV absorber, a light stabilizer, a hydrolysis inhibitor, a plasticizer, a lubricant, a preservative, an antifungal agents, a solid lubricant, a lubricating oil, and a grease as necessary.

Meanwhile, in the case where these additives are contained, these additives may leak from the back rubber portion 11a or each tooth rubber portion 11b and contaminate the use environment. Therefore, in the case where the toothed belt 10 is, for example, a toothed belt for use in a clean room, each of the above thermoplastic elastomer compositions preferably does not contain the above additives and is composed only of an elastomer component.

In the belt body 11, a hardness of the thermoplastic elastomer composition forming the back rubber portion 11a is not less than 25 and not greater than 70, and a hardness of the thermoplastic elastomer composition forming the tooth rubber portions 11b is not less than 40 and not greater than 70. In addition, the hardness of the thermoplastic elastomer composition forming the back rubber portion 11a is not greater than the hardness of the thermoplastic elastomer composition forming the tooth rubber portions 11b.

Since the back rubber portion 11a is soft, the toothed belt 10 having such a configuration is less likely to crack in the back surface thereof during use. In addition, since the tooth rubber portion 11b is hard, the toothed belt 10 is less likely to cause wear of the belt teeth during use and is therefore less likely to cause deformation of the belt teeth.

The hardness of the thermoplastic elastomer composition forming the back rubber portion 11a is preferably less than the hardness of the thermoplastic elastomer composition forming the tooth rubber portions 11b. In this case, the hardness of the thermoplastic elastomer composition forming the back rubber portion 11a is not less than 25 and less than 70, and the hardness of the thermoplastic elastomer composition forming the tooth rubber portions 11b is not less than 40 and not greater than 70.

The hardness of each of the above thermoplastic elastomer compositions is measured at 23° C. using a Type D durometer according to the standards of JIS K6253-3. This hardness is also referred to as Shore D hardness.

Hereinafter, in the present specification, the hardness of the thermoplastic elastomer composition forming the back rubber portion is also referred to simply as "back rubber portion hardness", and the hardness of the thermoplastic elastomer composition forming the tooth rubber portions is also referred to simply as "tooth rubber portion hardness".

In the toothed belt 10, the difference between the above back rubber portion hardness and the above tooth rubber portion hardness is preferably not less than 10 since it is more suitable for suppressing occurrence of cracks in the back surface. In this case, the hardness of the thermoplastic elastomer composition forming the back rubber portion 11a is not less than 25 and not greater than 60, and the hardness of the thermoplastic elastomer composition forming the tooth rubber portions 11b is not less than 40 and not greater than 70.

In the toothed belt 10, preferably, the back rubber portion hardness is not less than 25 and not greater than 50, and the tooth rubber portion hardness is not less than 45 and not greater than 65. This case is suitable for both suppressing occurrence of cracks in the back surface and suppressing deformation of the belt teeth.

The above back rubber portion hardness can be controlled by adjusting the molecular weight of the elastomer component contained in the thermoplastic elastomer composition forming the back rubber portion 11a, the ratio between the hard segment and the soft segment of the above elastomer component, the types and the amounts of additives other than the elastomer component contained in the above thermoplastic elastomer composition, etc.

As in the above back rubber portion hardness, the above tooth rubber portion hardness can also be controlled by the elastomer component and the additives other than the elastomer component contained in the thermoplastic elastomer composition forming the tooth rubber portions 11b.

<Cord>

The cord 13 is placed and embedded in a portion on the inner circumferential side of the back rubber portion 11a of the belt body 11 so as to form a spiral having a pitch in the belt width direction.

The outer diameter of the cord 13 is, for example, not less than 0.45 mm and not greater than 3.0 mm.

The pitch (placement pitch in the belt width direction) of the cord 13 is, for example, not less than 0.5 mm and not greater than 4.0 mm.

The cord 13 contains a large number of filaments, and is obtained by twisting the filaments.

The twisting method for the cord 13 is not particularly limited, and the twist thereof may be single twist having one twist layer, may be ply-twist or Lang twist having two twist layers, or may be twist having three twist layers.

All or some of the filaments contained in the cord 13 are carbon filaments made of a carbon fiber.

The filament diameter of each of the above carbon filaments is, for example, not less than 5 μm and not greater than 7 μm. The number of carbon filaments contained in the cord 13 is, for example, not less than 3000. The upper limit of the above number of carbon filaments is not particularly limited, and is, for example, 96000.

Examples of the above carbon filaments include PAN-based carbon filaments and pitch-based carbon filaments. From the viewpoint of being flexible, PAN-based carbon filaments are preferable as the carbon filaments.

In the toothed belt 10, the cord 13 can contain filaments made of another fiber in addition to the carbon filaments. Examples of the other fiber include inorganic fibers such as glass fibers and metal fibers, organic fibers such as aramid fibers, polyester fibers, PBO fibers, nylon fibers, and polyketone fibers, etc.

In the case where the cord 13 contains carbon filaments and filaments made of another fiber as constituent materials, the ratio of the carbon filaments to all filaments is not less than 50% by mass. It is more preferable if the ratio of the carbon filaments is larger (e.g., not less than 90% by mass).

As described above, the cord 13 contains carbon filaments. Since carbon filaments have a high elastic modulus, the toothed belt 10 having the cord 13 is less likely to be deformed even when a high load is applied thereto, and the toothed belt 10 is less likely to come out of mesh with a pulley. Therefore, a situation in which the toothed belt 10 comes out of mesh with the pulley, thereby getting caught on the pulley or the belt tooth 12 is chipped due to a local force applied to the toothed belt 10, can be avoided. In addition, since carbon filaments do not have creep characteristics as in filaments made of organic fibers, the toothed belt 10 is very difficult to stretch, and is less likely to cause a decrease in tension.

In the toothed belt 10, each filament contained in the cord 13 may be covered with a sizing covering layer composed of a sizing agent, or a plurality of twisted filaments contained in the cord 13 may be covered with an adhesive covering layer composed of an adhesive.

Examples of the sizing agent and the adhesive include an emulsion obtained by dispersing an epoxy group-containing compound and a curing agent in water, an aqueous solution containing an initial condensate of resorcinol and formaldehyde (also referred to as RF solution), an aqueous solution containing an initial condensate of resorcinol and formaldehyde and latex (also referred to as RFL solution), etc.

In the toothed belt 10, the cord 13 may be provided in a double-spiral configuration using two types of S-twisted and Z-twisted yarns such that these yarns alternate in the belt width direction. This case is suitable for inhibiting the toothed belt 10 from being shifted to one side during running.

The cord 13 may be composed of only an S-twisted or Z-twisted yarn.

<Reinforcement Fabric>

The reinforcement fabric 14 is attached so as to cover the surface of the belt body 11 on the inner circumferential side on which the plurality of tooth rubber portions 11b are provided. Therefore, in each belt tooth 12, the tooth rubber portion 11b is covered with the reinforcement fabric 14.

Accordingly, the thermoplastic elastomer composition forming the tooth rubber portions 11b and the pulley can be prevented from being in direct contact with each other. Therefore, wear of each tooth rubber portion 11b can be suppressed.

The thickness of the reinforcement fabric 14 is, for example, not less than 0.1 mm and not greater than 2.5 mm.

The reinforcement fabric 14 is composed of a fiber member such as a woven fabric, a knitted fabric, and a non-woven fabric, a resin film, or the like.

Examples of yarns for forming the above fiber member include nylon fibers (polyamide fibers), polyester fibers, aramid fibers, polyparaphenylenebenzobisoxazole (PBO) fibers, cotton, etc.

Examples of the material of the above resin film include nylon (polyamide), polyester, etc.

Among them, a fiber member formed with a nylon fiber contained as a main component and a nylon film (hereinafter, both are collectively referred to as nylon reinforcement fabric) are preferable.

The above nylon reinforcement fabric has a low coefficient of friction, thus has low frictional energy, and is less likely to wear.

The above nylon reinforcement fabric has a high melting point, and thus, even when the temperature of a contact portion with the pulley rises, rapid wear due to melting of the nylon reinforcement fabric is less likely to occur.

The reinforcement fabric 14 may have elasticity, for example, as in a woven fabric with a weft yarn subjected to woolly-finish or the like.

Here, the nylon fiber being contained as a main component means that the amount of the nylon fiber contained with respect to all the fibers is not less than 50% by mass.

The reinforcement fabric 14 may be subjected to an RFL treatment, in which the fabric is immersed in an RFL aqueous solution and then heated, as an adhesive treatment for increasing the adhesive strength with the above belt body.

The reinforcement fabric 14 may be subjected to a prime coat treatment, in which the fabric is immersed in an epoxy solution or isocyanate solution and then heated, prior to the above adhesive treatment.

The reinforcement fabric 14 may contain, on the surface thereof or in the interior thereof, a wear modifier such as PTFE (polytetrafluoroethylene) particles and ultra-high molecular weight polyethylene particles (e.g., with an average molecular weight of 1 million or more).

When the above wear modifier is contained, deformation of the toothed belt 10 due to wear of the tooth rubber portions is suppressed further.

The above PTFE particles or the ultra-high molecular weight polyethylene particles may be dispersed in the above-described RFL aqueous solution in advance, and a treatment using this RFL aqueous solution may be performed, whereby these particles may be contained in the reinforcement fabric 14.

In the case where the reinforcement fabric 14 is composed of a resin film, the above PTFE particles or the above ultra-high molecular weight polyethylene particle may be dispersed in the resin film in advance, whereby the above PTFE particles or the like may be contained in the reinforcement fabric 14.

Next, an example of a production method for the toothed belt 10 according to the present embodiment will be described.

Here, an example of the production method will be described with reference to FIG. 4 to FIG. 7.

Figure 4:
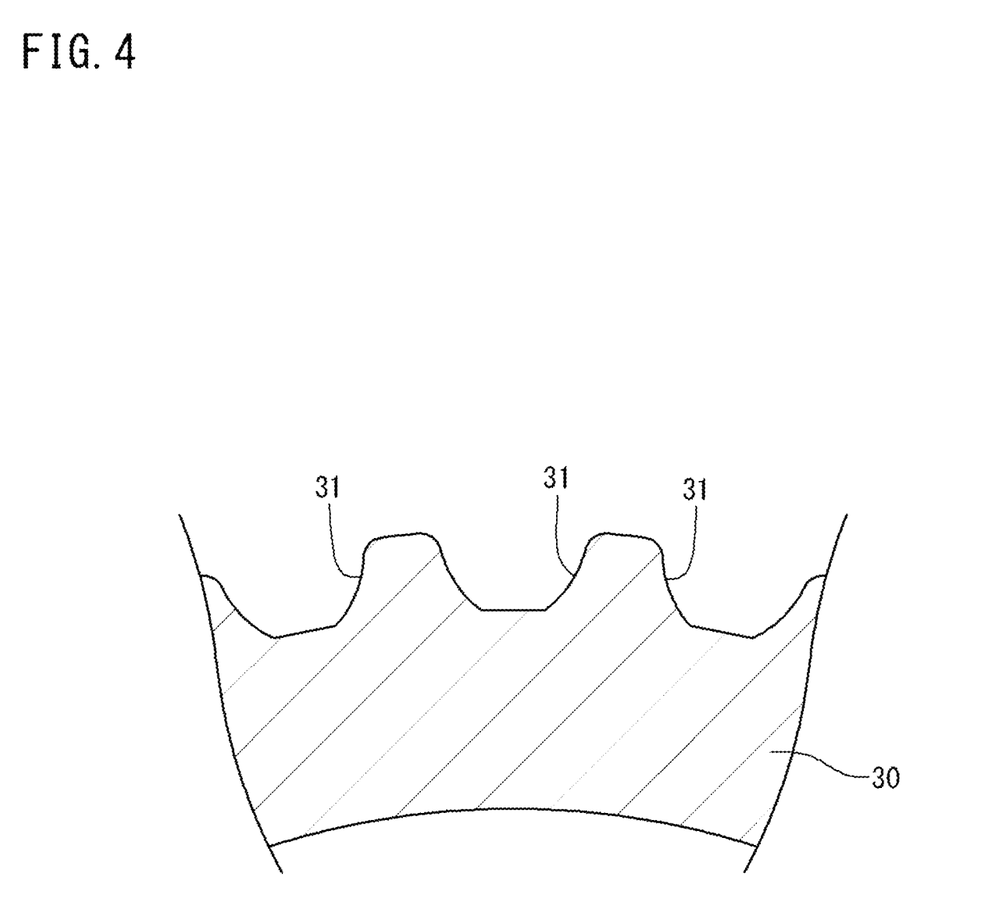
FIG. 4 is a partial cross-sectional view of a belt forming mold used in the production of the toothed belt.
Figure 5:
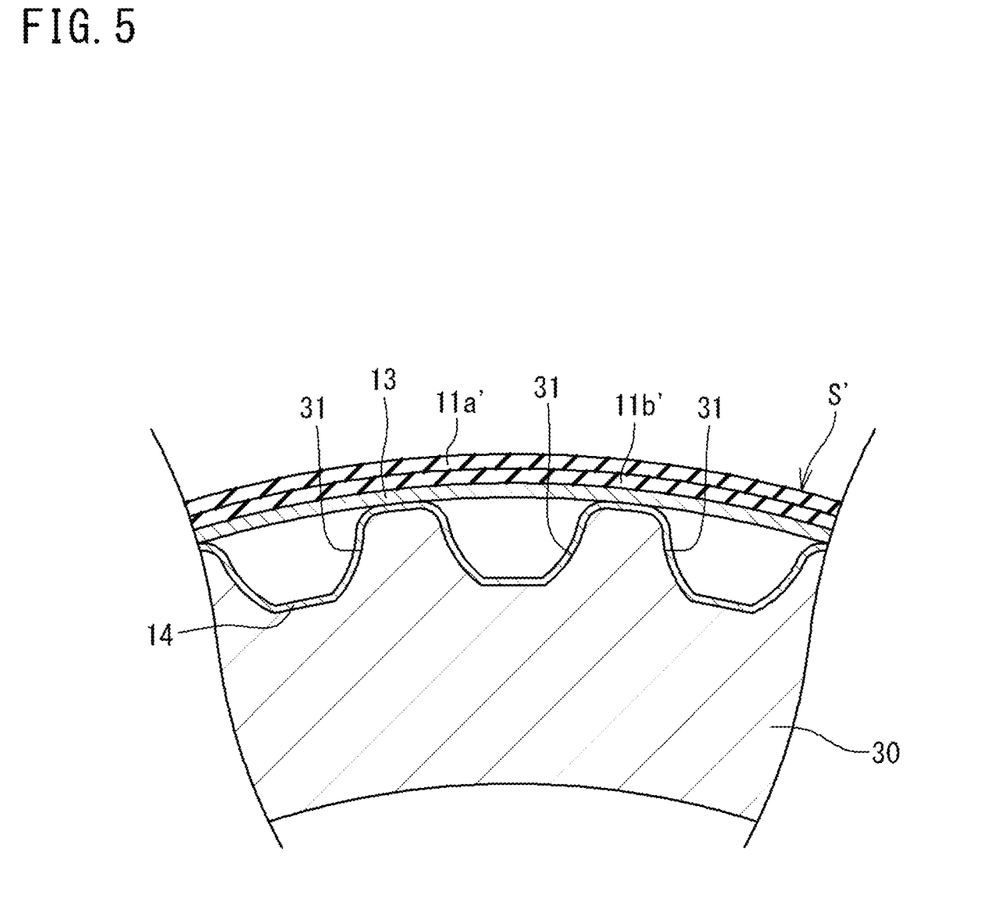
FIG. 5 illustrates a process for producing the toothed belt.
Figure 6:
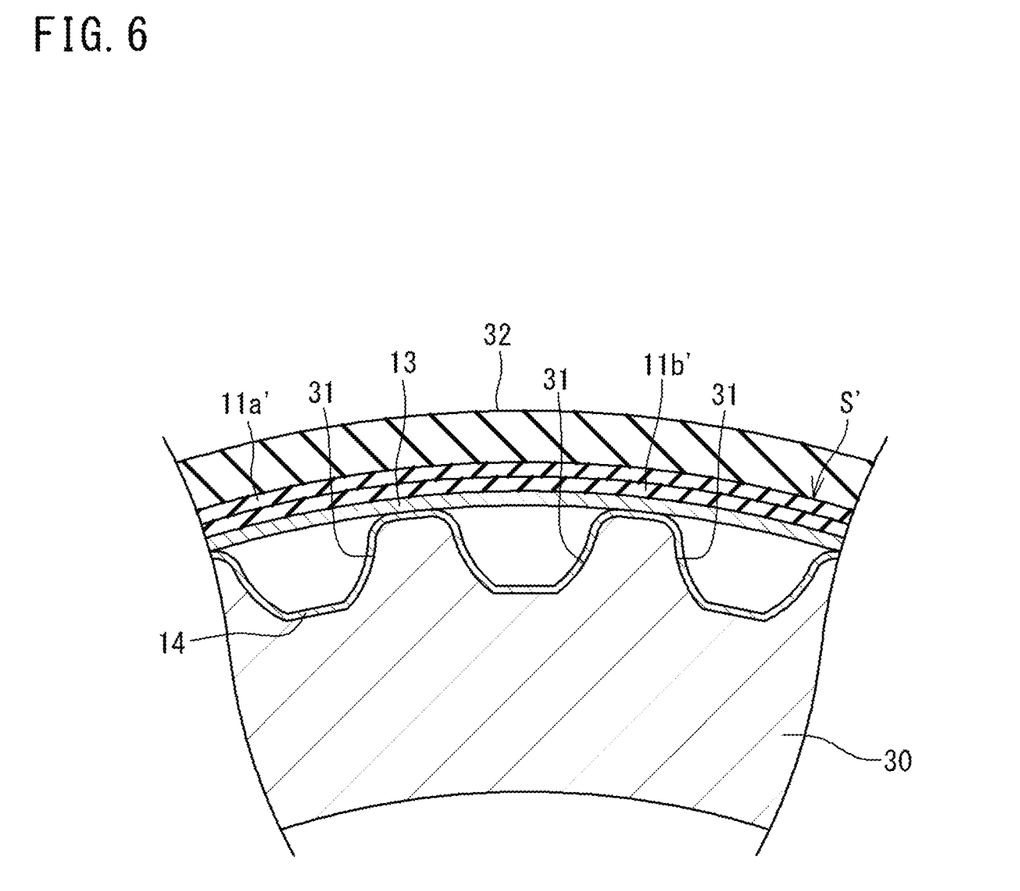
FIG. 6 illustrates the process for producing the toothed belt.
Figure 7:
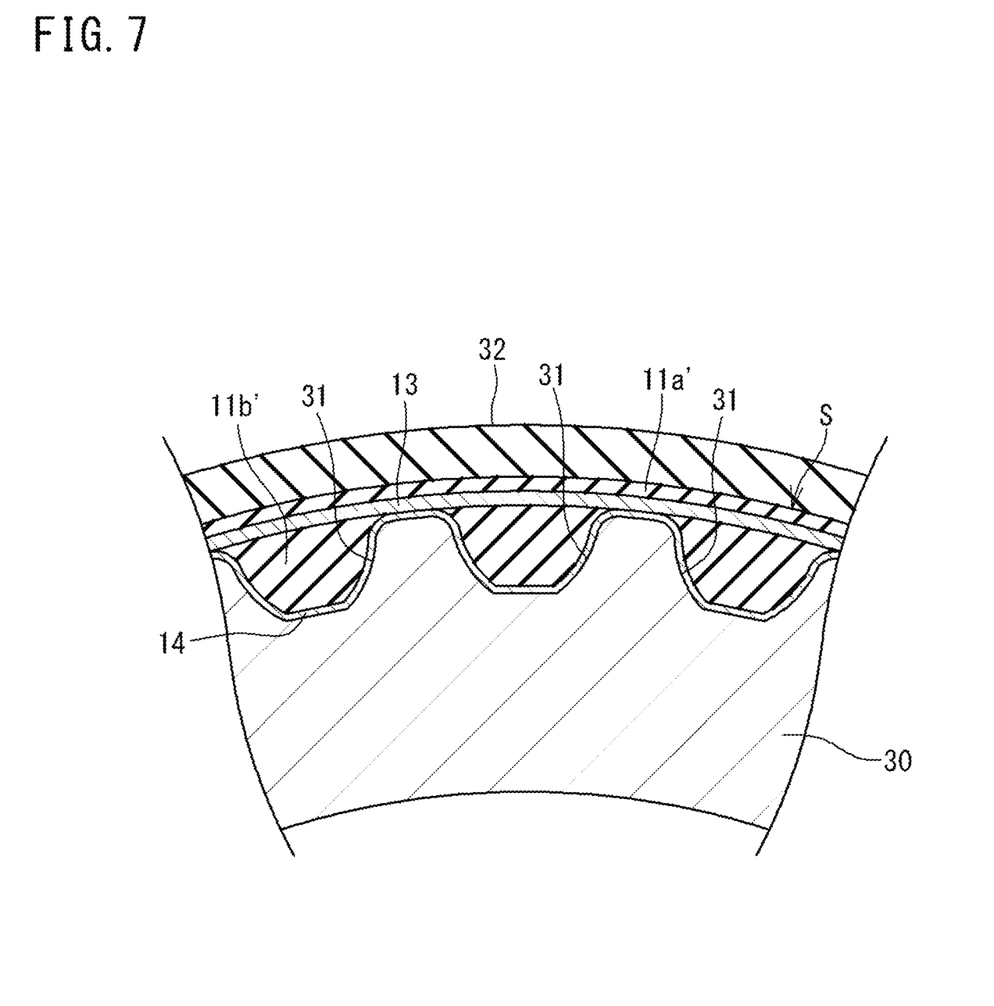
FIG. 7 illustrates the process for producing the toothed belt.

FIG. 4 is a partial cross-sectional view of a belt forming mold used in the production method of the toothed belt. FIG. 5 to FIG. 7 illustrate a production process of the production method.

The production method includes a material preparation step, a lamination step, a molding step, and a finishing step.

<Material Preparation Step>
<<Elastomer Sheets>>

A thermoplastic elastomer sheet for a back rubber portion and a thermoplastic elastomer sheet for tooth rubber portions are prepared. Each thermoplastic elastomer sheet is obtained, for example, by preparing a thermoplastic elastomer composition containing the TPAE or the TPC, which is an elastomer component, and necessary additives, and molding the thermoplastic elastomer composition into a sheet shape by extrusion or the like.

The thermoplastic elastomer sheet for a back rubber portion and the thermoplastic elastomer sheet for tooth rubber portions may be molded by co-extrusion. In this case, a laminate of the thermoplastic elastomer sheet for a back rubber portion and the thermoplastic elastomer sheet for tooth rubber portions is obtained.

The elastomer sheets molded in this step may be rolled up once or supplied directly to the next step.

<<Reinforcement Fabric>>

A reinforcement fabric (tooth portion covering material) having a tooth profile corresponding to the shape of the belt teeth is prepared.

(1) Case where the reinforcement fabric 14 is a thermoplastic resin film such as a polyamide film.

A resin film is molded into a toothed shape by placing the resin film along a heated mold having recesses having the same shape as the tooth profile of the belt, and pressing a soft elastic body from the side opposite to the mold.

Alternatively, a toothed resin film is produced by extruding a resin film, and then performing cooling while forming a toothed shape in the resin film by passing the resin film through two rolls having the same tooth profile as that of the belt.

Still alternatively, a toothed resin film is produced by passing a resin film through two heated rolls having a tooth profile.

Then, the toothed resin film may be formed into a tubular shape.

(2) Case where the reinforcement fabric 14 is a fiber member such as a woven fabric, a knitted fabric, or a nonwoven fabric.

First, if necessary, the fiber member is subjected to an adhesive treatment using an RF aqueous solution, an RFL aqueous solution, or the like to fill the interior of the fiber member with an adhesive treatment agent and cover the surface of the fiber member forming a belt surface with the adhesive treatment agent.

Next, the fiber member is molded into a toothed shape by placing the fiber member along a heated mold having recesses having the same shape as the tooth profile of the belt, and pressing a soft elastic body from the side opposite to the mold.

Then, the toothed fiber member may be formed into a tubular shape.

<<Cord>>

The cord 13 is prepared by applying a predetermined twist, an adhesive treatment, etc., to carbon filaments. Here, an S-twisted cord and a Z-twisted cord are preferably prepared as a pair of cords.

<Lamination Step>

FIG. 4 is a partial cross-sectional view showing a part of a belt forming mold 30.

The belt forming mold 30 has a cylindrical shape, and has an outer circumferential surface on which a plurality of tooth portion-forming grooves 31 are formed so as to extend in the axial direction thereof and are spaced in the circumferential direction thereof.

As shown in FIG. 5, the toothed tubular reinforcement fabric 14 is placed over the outer circumferential surface of the belt forming mold 30, and the pair of cords 13 are spirally wound thereon.

Then, a thermoplastic elastomer sheet 11b' for tooth rubber portions and a thermoplastic elastomer sheet 11a' for a back rubber portion are wound thereon in this order. The number of layers of each wound sheet may be one or may be two or more, depending on the dimensions of the belt to be produced.

Furthermore, a mold release paper or mold release film (not shown) is wound if necessary.

Thus, a laminate S' is formed on the belt forming mold 30.

<Molding Step>

A jacket having a rubber sleeve 32 on an inner surface thereof and having a closed space between the rubber sleeve 32 and a body thereof is placed over the laminate S'. Accordingly, the rubber sleeve 32 is placed over the laminate S' on the belt forming mold 30 as shown in FIG. 6.

High-pressure steam is put into the interior of the forming mold 30 on which the laminate S' is wound and the space of the jacket, to heat and compress the interior of the forming mold 30 and the space of the jacket. Accordingly, the thermoplastic elastomers for forming the thermoplastic elastomer sheets 11a' and 11b' are poured into the tooth portion-forming grooves 31 through the gaps between the cords to form belt teeth (see FIG. 7).

At this time, the temperature of the high-pressure steam is set to a temperature equal to or higher than the temperature at which the thermoplastic elastomers flow. In the case where the elastomer component of each thermoplastic elastomer sheet is the TPAE, the temperature of the high-pressure steam is set to 170° C. or higher.

After the above belt teeth are formed, the jacket and the forming mold 30 are cooled with water or the like to decrease the temperatures of the elastomers to 100° C. or lower, and then the forming mold 30 and a molded article S are taken out from the jacket. Furthermore, if the temperature of the molded article S is 40° C. or higher, the molded article S is further cooled. When the temperature of the molded article S is decreased to lower than 40° C., the molded article S is pulled out from the forming mold 30.
<Finishing Step>

The taken-out molded article is cut into a specified width and separated, thereby obtaining a toothed belt.

The toothed belt 10 can be produced through such steps.
<Others>

In the case where the hardness of the thermoplastic elastomer sheet 11b' for tooth rubber portions and the hardness of the thermoplastic elastomer sheet 11a' for a back rubber portion are different from each other, the reinforcement fabric 14, the cord 13, and the thermoplastic elastomer sheet 11b' for a tooth rubber portion may be stacked on the outer circumferential surface of the belt forming mold 30, then heating and compression by the above-described high-pressure steam may be performed to form belt teeth, and cooling may be performed once. Then, the thermoplastic elastomer sheet 11a' for a back rubber portion may be wound, heating and compression by the high-pressure steam may be performed again, then cooling may be performed again, and a finishing step may be finally performed, thereby producing a toothed belt.

EXAMPLES

Hereinafter, the embodiment of the present invention will be more specifically described by means of examples, but the embodiment of the present invention is not limited to the examples below.

Examples and Comparative Examples

Here, toothed belts with a tooth type of S8M were produced, and the performance thereof was evaluated.

Each toothed belt was produced using the production method already described above.

Thermoplastic elastomer compositions, a cord, and a reinforcement fabric for forming a belt body (a back rubber portion and tooth rubber portions) were prepared as follows.
(Thermoplastic Elastomer Compositions)

The PEBAX (registered trademark) series manufactured by Arkema S.A., which are commercially available TPAE, were selected and used according to hardness. Here, one type of product was selected and used, or two types of products were blended to adjust the hardness of a thermoplastic elastomer composition, and were used.

The product numbers of PEBAX used in Examples and Comparative Examples and hardnesses corresponding thereto are as shown in Table 1.

PEBAX is a TPAE with a polyol as a soft segment.

TABLE 1

| Product numbers of PEBAX | 2533 | 3533 | 4033 | 4533 | 5533 | 6333 | 7033 | 80R53 |
|---|---|---|---|---|---|---|---|---|
| Hardness | 27 | 33 | 42 | 46 | 54 | 64 | 69 | 73 |

(Cord)

S-twisted and Z-twisted yarns for which a carbon cord (TENAX manufactured by TEIJIN LIMITED, filament diameter: 7 μm, number of filaments: 12000) was used were prepared. The cord was a single twisted yarn having a cord diameter of 0.95 mm and treated with an epoxy-based adhesive.

(Reinforcement Fabric)

An RFL-treated nylon canvas was prepared as a reinforcement fabric.

Here, a nylon canvas in which a warp yarn was a yarn of 6,6-nylon fiber and a weft yarn was a woolly-finished yarn of 6,6-nylon fiber was prepared.

Apart from this, an RFL aqueous solution (latex was vinylpyridine-styrene-butadiene rubber latex) was prepared.

The above nylon canvas was immersed in the above RFL aqueous solution, pulled up, and then heat-treated.

Example 1

A toothed belt with a tooth type of S8M was produced by a production method for a toothed belt in which the hardness of the above-described thermoplastic elastomer sheet for tooth rubber portions and the hardness of the above-described thermoplastic elastomer sheet for a back rubber portion are different, using PEBAX 4033 as a TPAE for a back rubber portion, PEBAX 5533 as a TPAE for tooth rubber portions, the above carbon cord as a cord, and the above nylon canvas as a reinforcement fabric. The belt width was set to 8 mm, and the belt length was set to 1200 mm.

Examples 2 to 9

Toothed belts were produced in the same manner as Example 1, except that PEBAX with the product numbers shown in Table 2 was used as the TPAE.

Example 9 is an example in which the hardness of the thermoplastic elastomer sheet for tooth rubber portions and the hardness of the thermoplastic elastomer sheet for a back rubber portion are the same, and for Example 9 as well, a toothed belt was produced in the same manner as Example 1.

Comparative Examples 1 to 4

Toothed belts were produced in the same manner as Example 1, except that PEBAX with the product numbers shown in Table 2 was used as the TPAE.
(Evaluation Method)

A durability test 1 and a durability test 2 for evaluating durability were conducted for the toothed belts produced in each Example and each Comparative Example. The results are shown in Table 2.
<Durability Test 1>

The durability test 1 is a test for evaluating durability under standard running conditions, and was conducted for the toothed belts produced in Examples 1 to 9 and Comparative Examples 1 to 4.

Figure 8:
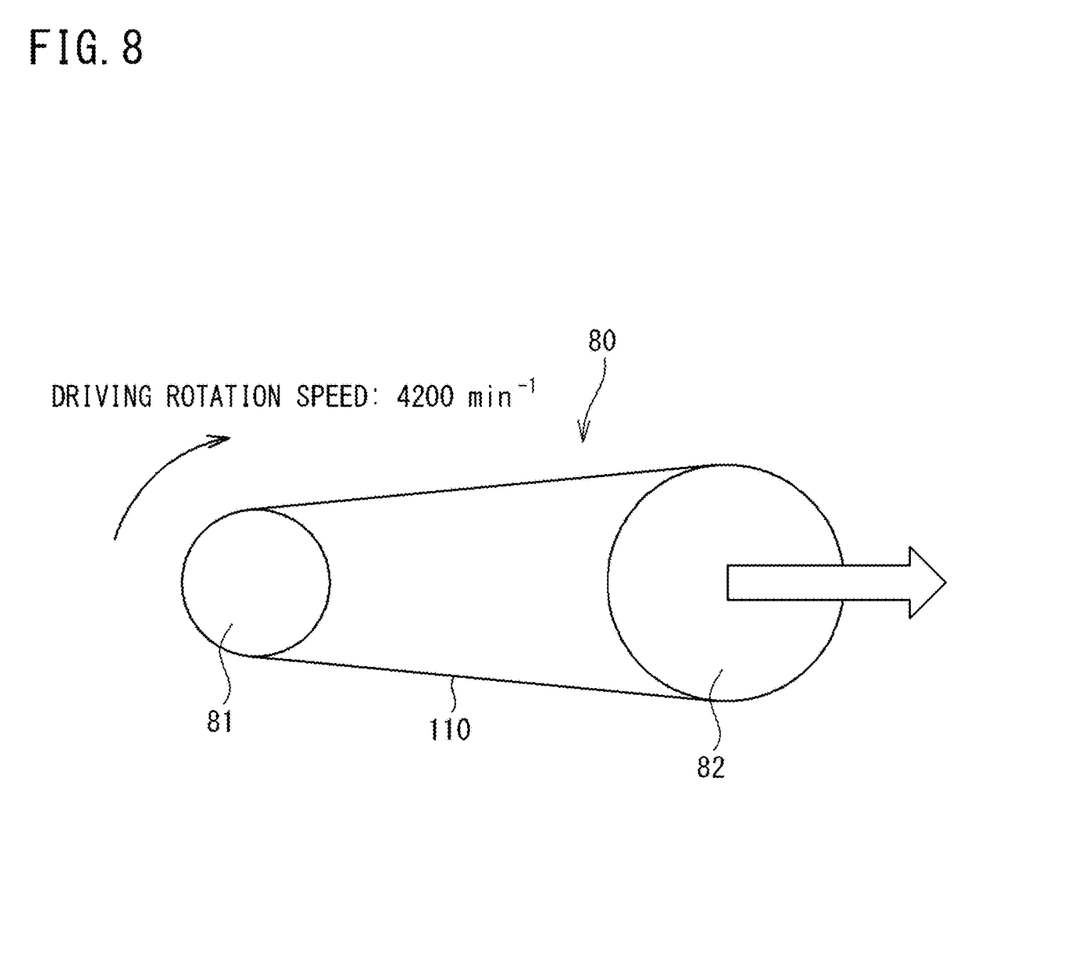
FIG. 8 shows a layout of pulleys in a durability test 1.

FIG. 8 shows a belt durability tester 80 used in the durability test 1.

The belt durability tester 80 includes a drive pulley 81 having 22 teeth and an 8M tooth profile, and a driven pulley 82 having 33 teeth and an 8M tooth profile and provided on the right side of the drive pulley 81. The driven pulley 82 is provided so as to be movable to the left and right such that an axial load (dead weight) can be applied.

A toothed belt 110 produced in each of Examples 1 to 9 and Comparative Examples 1 to 4 was trained between the drive pulley 81 and the driven pulley 82 of the belt durability tester 80, belt tension was applied to the driven pulley 82 by applying an axial load of 608 N to the right side of the driven pulley 82, a rotational load of 34.2 N·m was applied to the driven pulley 82, and the drive pulley 81 was rotated at a rotation speed of 4200 min' under room temperature to run the belt. Then, the belt running was stopped periodically to visually check whether or not any crack had occurred in the back surface of the back rubber, and the belt running time until any crack was observed was measured. The maximum belt running time was 1000 hours.

If tooth skipping occurred even if no crack occurred, the test was terminated at that point.

<Durability Test 2>

The durability test 2 is a test for evaluating durability under high-load and low-tension conditions, and was conducted for the toothed belts produced in Examples 1 and 2 and Comparative Example 4, which had the best results of the durability test 1 among the Comparative Examples.

Figure 9:
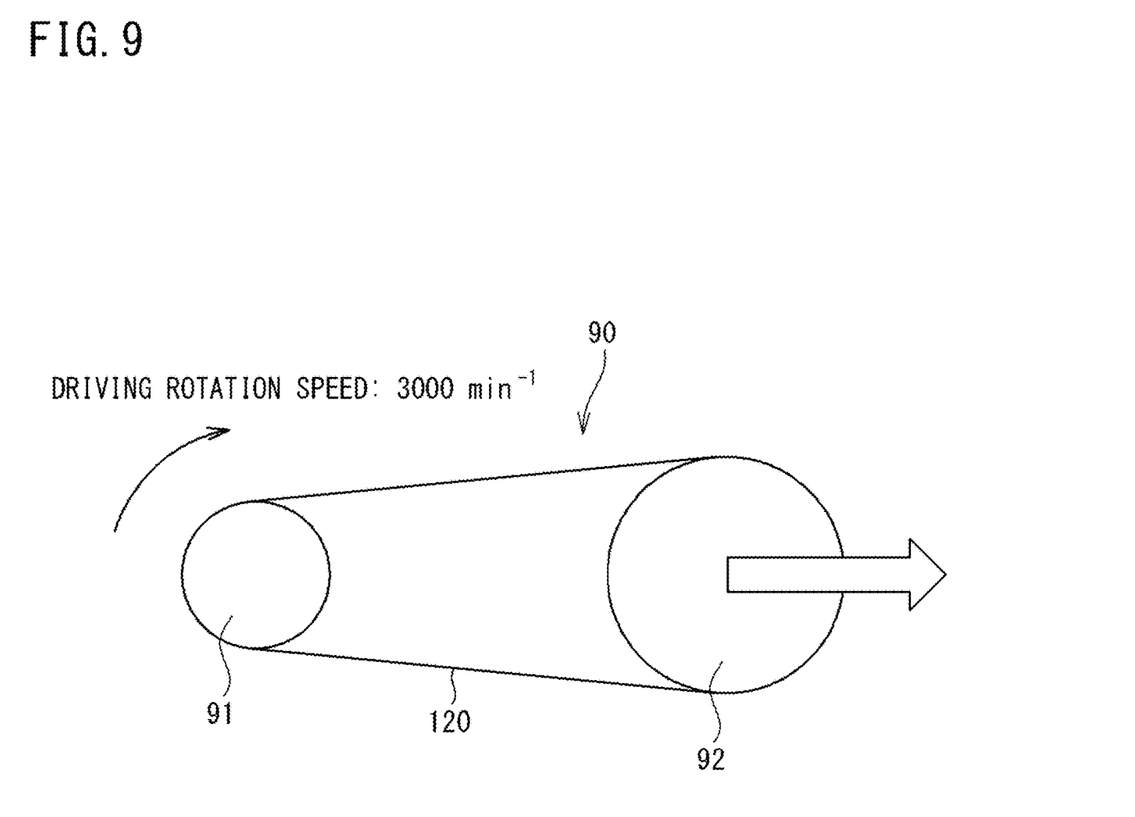
FIG. 9 shows a layout of pulleys in a durability test 2.

FIG. 9 shows a belt durability tester 90 used in the durability test 2.

The belt durability tester 90 includes a drive pulley 91 having 24 teeth and an 8M tooth profile, and a driven pulley 92 having 36 teeth and an 8M tooth profile and provided on the right side of the drive pulley 91. The driven pulley 92 is provided so as to be movable to the left and right such that an axial load (dead weight) can be applied.

A toothed belt 120 produced in each of Examples 1 and 2 and Comparative Example 4 was trained between the drive pulley 91 and the driven pulley 92 of the belt durability tester 90, belt tension was applied to the driven pulley 92 by applying an axial load of 520 N to the right side of the driven pulley 92, a rotational load of 39.2 N·m was applied to the driven pulley 92, and the drive pulley 91 was rotated at a rotation speed of 3000 min$^{-1}$ under room temperature to run the belt. Then, the belt running was stopped periodically to visually check whether or not any tooth was chipped, and the belt running time until tooth chipping was observed was measured.

If tooth skipping occurred even if no tooth chipping occurred, the test was terminated at that point.

TABLE 2

|  | Example |  |  |  |  |  |  |
| --- | --- | --- | --- | --- | --- | --- | --- |
|  | 1 | 2 | 3 | 4 | 5 | 6 | 7 |
| Production number of PEBAX used for back rubber portion | 4033 | 4033 | 4033 | 2533/3533 | 4533/5533 | 2533 | 2533/3533 |
| Production number of PEBAX used for tooth rubber portions | 5533 | 4533 | 6333 | 5533 | 5533 | 5533 | 4033 |
| Hardness of back rubber portion | 42 | 42 | 42 | 30 | 50 | 27 | 30 |
| Hardness of tooth rubber portions | 54 | 46 | 64 | 54 | 54 | 54 | 42 |
| Difference in hardness between back rubber portion and tooth rubber portions ([tooth rubber]-[back rubber]) | 12 | 4 | 22 | 24 | 4 | 27 | 12 |
| Durability test 1 (hours) (running conditions: standard) | 576 | 602 | 521 | 726 | 237 | 1000 | 787 |
| Failure mode | Back surface crack | Back surface crack | Back surface crack | Back surface crack | Back surface crack | Running stop without abnormality | Back surface crack |
| Durability test 2 (hours) (running conditions: high load and low tension) | 124 | 67 |  |  |  |  |  |
| Failure mode | Wear → tooth chipping | Wear → tooth chipping |  |  |  |  |  |

|  | Example |  | Comparative Example |  |  |  |
| --- | --- | --- | --- | --- | --- | --- |
|  | 8 | 9 | 1 | 2 | 3 | 4 |
| Production number of PEBAX used for back rubber portion | 4033 | 4533/5533 | 2533 | 6333 | 80R53 | 4533/5533 |
| Production number of PEBAX used for tooth rubber portions | 7033 | 4533/5533 | 3533 | 80R53 | 7033 | 4533 |
| Hardness of back rubber portion | 42 | 50 | 27 | 64 | 73 | 50 |
| Hardness of tooth rubber portions | 69 | 50 | 33 | 73 | 69 | 46 |
| Difference in hardness between back rubber portion and tooth rubber portions ([tooth rubber]-[back rubber]) | 27 | 0 | 6 | 9 | −4 | −4 |
| Durability test 1 (hours) (running conditions: standard) | 598 | 261 | 12 | 41 | 0.5 | 210 |

TABLE 2-continued

| Failure mode | Back surface crack | Back surface crack | Deformation → tooth skipping | Back surface crack | Back surface crack | Back surface crack |
|---|---|---|---|---|---|---|
| Durability test 2 (hours) (running conditions: high load and low tension) | | | | | | 59 |
| Failure mode | | | | | | Incomplete meshing → tooth skipping |

As is obvious from the results in Table 2, in the toothed belt according to the embodiment of the present invention, occurrence of cracks in the back surface of the belt and deformation of the belt teeth are suppressed.

INDUSTRIAL APPLICABILITY

The toothed belt according to the embodiment of the present invention is useful in the technical field of toothed belts in which thermoplastic elastomer compositions are used as materials for tooth rubber portions and a back rubber portion.

REFERENCE SIGNS LIST 10, 110, 120 toothed belt
11 belt body
11a back rubber portion
11b tooth rubber portion
12 belt tooth
13 cord
14 reinforcement fabric
15 tooth bottom portion
30 belt forming mold
31 tooth portion-forming groove
32 rubber sleeve
80, 90 belt durability tester
81, 91 drive pulley
82, 92 driven pulley

The invention claimed is:

1. A toothed belt comprising:
a belt body having a flat band-shaped back rubber portion and a plurality of tooth rubber portions placed on an inner circumferential side of the back rubber portion, provided integrally with the back rubber portion, and forming tooth portions, respectively, the back rubber portion and the tooth rubber portions being each composed of a thermoplastic elastomer composition;
a cord placed and embedded in a portion on the inner circumferential side of the back rubber portion so as to form a spiral having a pitch in a belt width direction, and containing carbon filaments; and
a tooth portion covering material provided on an inner circumferential side of the belt body and covering the plurality of tooth rubber portions, wherein
an elastomer component of the thermoplastic elastomer composition is a polyamide-based thermoplastic elastomer (TPAE) or a polyester-based thermoplastic elastomer (TPC),
a Shore D hardness of the thermoplastic elastomer composition forming the back rubber portion is not less than 25 and not greater than 70,
a Shore D hardness of the thermoplastic elastomer composition forming the tooth rubber portions is not less than 54 and not greater than 70, and
the Shore D hardness of the thermoplastic elastomer composition forming the back rubber portion is less than the Shore D hardness of the thermoplastic elastomer composition forming the tooth rubber portions.

2. The toothed belt according to claim 1, wherein a difference between the Shore D hardness of the thermoplastic elastomer composition forming the back rubber portion and the Shore D hardness of the thermoplastic elastomer composition forming the tooth rubber portions is not less than 10.

3. The toothed belt according to claim 1, wherein
the Shore D hardness of the thermoplastic elastomer composition forming the back rubber portion is not less than 25 and not greater than 50, and
the Shore D hardness of the thermoplastic elastomer composition forming the tooth rubber portions is not less than 54 and not greater than 65.

4. The toothed belt according to claim 1, wherein the elastomer component is a polyamide-based thermoplastic elastomer (TPAE).

5. The toothed belt according to claim 2, wherein
the Shore D hardness of the thermoplastic elastomer composition forming the back rubber portion is not less than 25 and not greater than 50, and
the Shore D hardness of the thermoplastic elastomer composition forming the tooth rubber portions is not less than 54 and not greater than 65.

6. The toothed belt according to claim 2, wherein the elastomer component is a polyamide-based thermoplastic elastomer (TPAE).

7. The toothed belt according to claim 3, wherein the elastomer component is a polyamide-based thermoplastic elastomer (TPAE).

8. The toothed belt according to claim 1, wherein each of the thermoplastic elastomer composition forming the back rubber portion and the thermoplastic elastomer composition forming the tooth rubber portions contains only the elastomer component.

* * * * *